US011425048B2

(12) United States Patent
Vasseur et al.

(10) Patent No.: US 11,425,048 B2
(45) Date of Patent: Aug. 23, 2022

(54) USING THROUGHPUT MODE DISTRIBUTION AS A PROXY FOR QUALITY OF EXPERIENCE AND PATH SELECTION IN THE INTERNET

(71) Applicant: Cisco Technology, Inc., San Jose, CA (US)

(72) Inventors: Jean-Philippe Vasseur, Saint Martin d'Uriage (FR); Grégory Mermoud, Venthône (CH); David Tedaldi, Zurich (CH); Vinay Kumar Kolar, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 62 days.

(21) Appl. No.: 17/122,711

(22) Filed: Dec. 15, 2020

(65) Prior Publication Data

US 2022/0191143 A1 Jun. 16, 2022

(51) Int. Cl.
*H04L 47/00* (2022.01)
*H04L 47/24* (2022.01)
*H04L 47/25* (2022.01)

(52) U.S. Cl.
CPC .............. *H04L 47/24* (2013.01); *H04L 47/25* (2013.01)

(58) Field of Classification Search
CPC ............ H04L 41/0823; H04L 41/5067; H04L 43/087; H04L 43/0888; H04L 43/0894; H04L 47/24; H04L 47/25; H04L 67/303
USPC ...................................................... 370/230
See application file for complete search history.

(56) References Cited

U.S. PATENT DOCUMENTS

| | | | |
|---|---|---|---|
| 8,670,419 B2 * | 3/2014 | Chin .................... | H04L 5/0064 370/336 |
| 11,290,778 B2 * | 3/2022 | Halepovic ............. | H04L 43/026 |
| 2010/0014420 A1 | 1/2010 | Wang | |
| 2016/0112732 A1 * | 4/2016 | Li ..................... | H04N 21/64769 725/116 |
| 2018/0104129 A1 | 4/2018 | Vasseur | |
| 2018/0367421 A1 * | 12/2018 | Cloonan ............... | H04L 43/022 |
| 2019/0052405 A1 * | 2/2019 | Schoppmeier ......... | H04L 1/009 |
| 2019/0068474 A1 | 2/2019 | Vasseur | |

(Continued)

FOREIGN PATENT DOCUMENTS

EP 3035628 6/2016

OTHER PUBLICATIONS

Boutaba, et al., "A Comprehensive Survey on Machine Learning for Networking: Evolution, Applications and Research Opportunities", Journal of Internet Services and Applications, Jun. 2018, 9:16, 99 pages, SpringerOpen.

*Primary Examiner* — Robert J Lopata
(74) *Attorney, Agent, or Firm* — Behmke Innovation Group LLC; Kenneth J. Heywood; Jonathon P. Western

(57) ABSTRACT

In one embodiment, a device calculates one or more distributions of bitrates associated with an application whose traffic is conveyed via one or more paths in a network. The device detects throughput modes of the application, based on the one or more distributions of bitrates associated with the application. The device associates each throughput mode with a quality of experience label, to form a plurality of pairs of throughput modes and quality of experience labels. The device estimates a quality of experience metric for the application, based on a bitrate of the application and the plurality of pairs of throughput modes and quality of experience labels.

20 Claims, 9 Drawing Sheets

(56) References Cited

U.S. PATENT DOCUMENTS

| | | | |
|---|---|---|---|
| 2019/0098067 A1* | 3/2019 | Sandoval | H04L 65/4084 |
| 2019/0222491 A1* | 7/2019 | Tomkins | H04L 41/5087 |
| 2020/0099733 A1 | 3/2020 | Chu et al. | |
| 2020/0106815 A1* | 4/2020 | Wang | H04L 65/602 |
| 2020/0311124 A1* | 10/2020 | Gupta | H04N 21/4524 |
| 2021/0204011 A1* | 7/2021 | Jain | H04L 43/08 |
| 2021/0288898 A1* | 9/2021 | Shen | H04L 41/5038 |
| 2022/0030308 A1* | 1/2022 | Bentaleb | H04N 21/26258 |
| 2022/0045959 A1* | 2/2022 | Chauhan | H04L 43/0894 |

* cited by examiner

USING THROUGHPUT MODE DISTRIBUTION AS A PROXY FOR QUALITY OF EXPERIENCE AND PATH SELECTION IN THE INTERNET

TECHNICAL FIELD

The present disclosure relates generally to computer networks, and, more particularly, to using throughput mode distribution as a proxy for quality of experience and path selection in the Internet.

BACKGROUND

Software-defined wide area networks (SD-WANs) represent the application of software-defined networking (SDN) principles to WAN connections, such as connections to cellular networks, the Internet, and Multiprotocol Label Switching (MPLS) networks. The power of SD-WAN is the ability to provide consistent service level agreement (SLA) for important application traffic transparently across various underlying tunnels of varying transport quality and allow for seamless tunnel selection based on tunnel performance characteristics that can match application SLAs and satisfy the quality of service (QoS) requirements of the traffic (e.g., in terms of delay, jitter, packet loss, etc.).

On the application side, the networking requirements are often poorly understood, even for very common applications such as voice and video for which a variety of metrics have been developed over the past two decades, with the hope of accurately representing the Quality of Experience (QoE) from the standpoint of the users of the application. Typically, QoE is measured by applying static SLA templates to QoS probes. However, this approach often ranges range from being only weakly correlated with the QoE of the application to being completely useless in discerning the QoE of the application.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
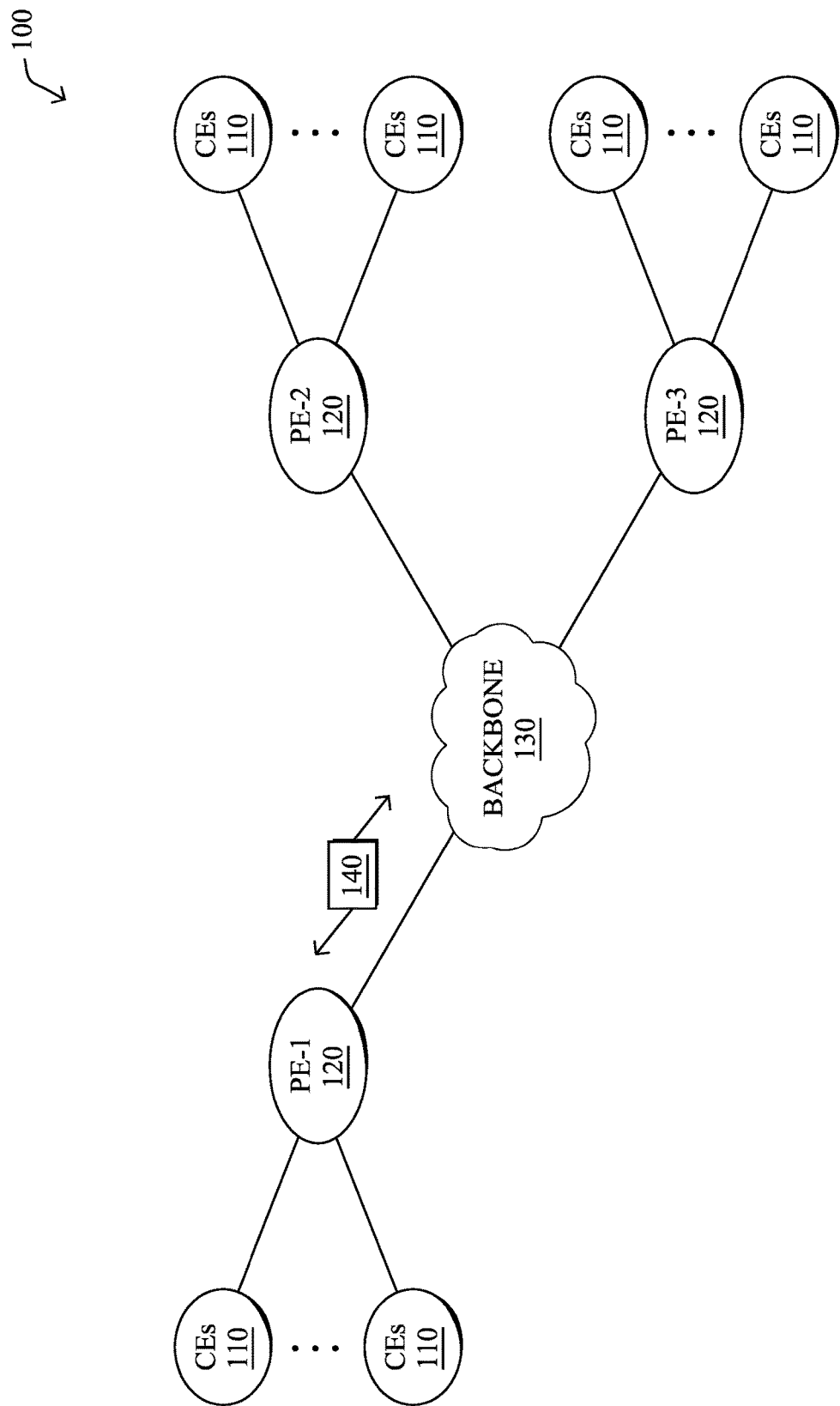
FIGS. 1A-1B illustrate an example communication network.

According to one or more embodiments of the disclosure, a device calculates one or more distributions of bitrates associated with an application whose traffic is conveyed via one or more paths in a network. The device detects throughput modes of the application, based on the one or more distributions of bitrates associated with the application. The device associates each throughput mode with a quality of experience label, to form a plurality of pairs of throughput modes and quality of experience labels. The device estimates a quality of experience metric for the application, based on a bitrate of the application and the plurality of pairs of throughput modes and quality of experience labels.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B 1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
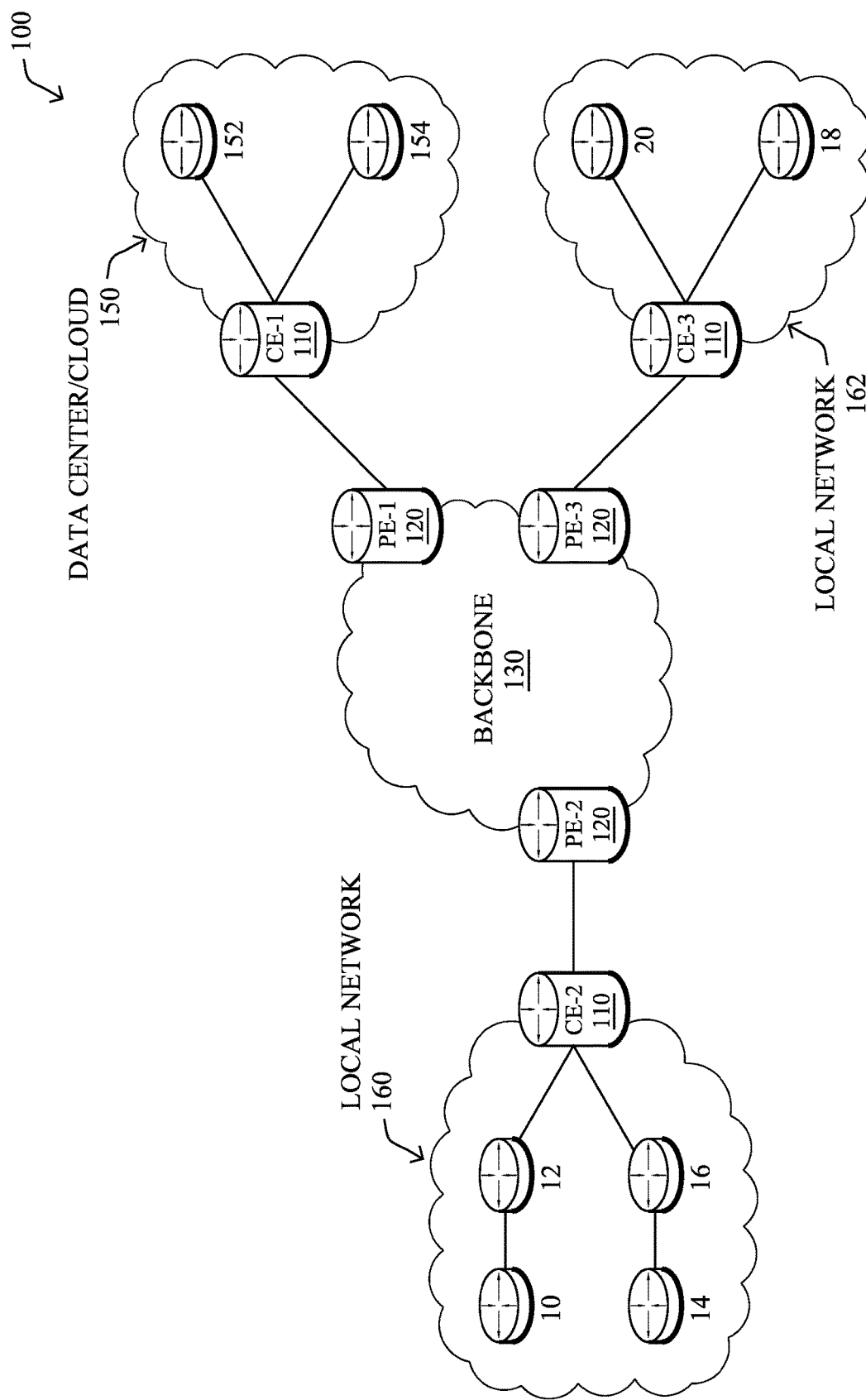

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
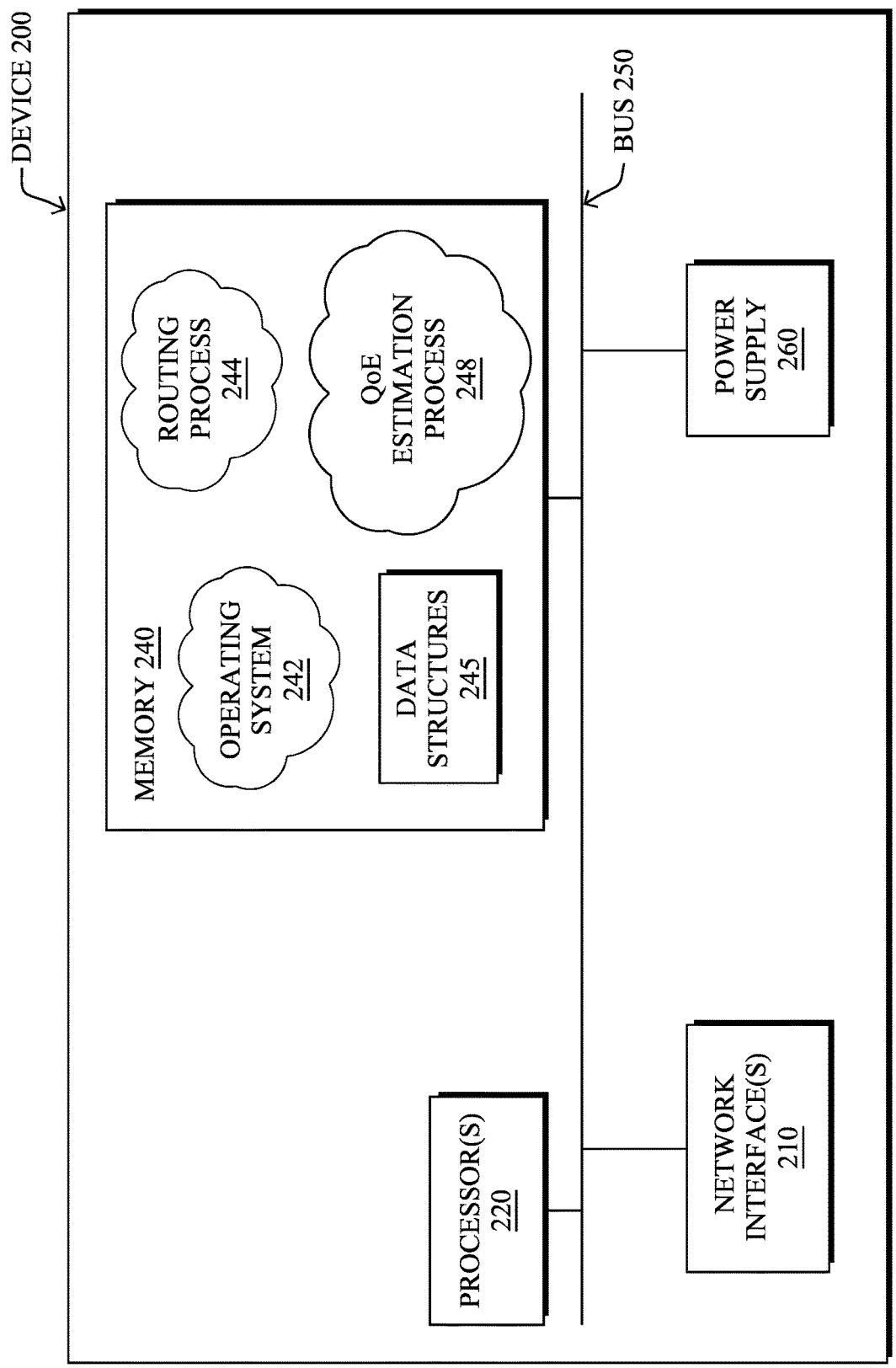
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a routing process 244 and/or a quality of experience (QoE) estimation process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, routing process (services) 244 contains computer executable instructions executed by the processor 220 to perform functions provided by one or more routing protocols. These functions may, on capable devices, be configured to manage a routing/forwarding table (a data structure 245) containing, e.g., data used to make routing/forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). For instance, paths may be computed using a shortest path first (SPF) or constrained shortest path first (CSPF) approach. Conversely, neighbors may first be discovered (e.g., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

In various embodiments, as detailed further below, routing process 244 and/or QoE estimation process 248 may also include computer executable instructions that, when executed by processor(s) 220, cause device 200 to perform the techniques described herein. To do so, in some embodiments, routing process 244 and/or QoE estimation process 248 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, routing process 244 and/or QoE estimation process 248 may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as being indicative of an acceptable QoE or an unacceptable QoE. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that routing process 244 and/or QoE estimation process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of times the model incorrectly predicted the QoE of an application not being acceptable. Conversely, the false negatives of the model may refer to the number of times the model incorrectly predicted that the QoE of the application is acceptable. True negatives and positives may refer to the number of times the model correctly predicted an acceptable QoE or an unacceptable QoE, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, in software defined WANs (SD-WANs), traffic between individual sites are sent over tunnels. The tunnels are configured to use different switching fabrics, such as MPLS, Internet, 4G or 5G, etc. Often, the different switching fabrics provide different quality of service (QoS) at varied costs. For example, an MPLS fabric typically provides high QoS when compared to the Internet, but is also more expensive than traditional Internet. Some applications requiring high QoS (e.g., video conferencing, voice calls, etc.) are traditionally sent over the more costly fabrics (e.g., MPLS), while applications not needing strong guarantees are sent over cheaper fabrics, such as the Internet.

Traditionally, network policies map individual applications to Service Level Agreements (SLAs), which define the satisfactory performance metric(s) for an application, such as loss, latency, or jitter. Similarly, a tunnel is also mapped to the type of SLA that is satisfies, based on the switching fabric that it uses. During runtime, the SD-WAN edge router then maps the application traffic to an appropriate tunnel. Currently, the mapping of SLAs between applications and tunnels is performed manually by an expert, based on their experiences and/or reports on the prior performances of the applications and tunnels.

The emergence of infrastructure as a service (IaaS) and software as a service (SaaS) is having a dramatic impact of the overall Internet due to the extreme virtualization of services and shift of traffic load in many large enterprises. Consequently, a branch office or a campus can trigger massive loads on the network.

Figure 3A:
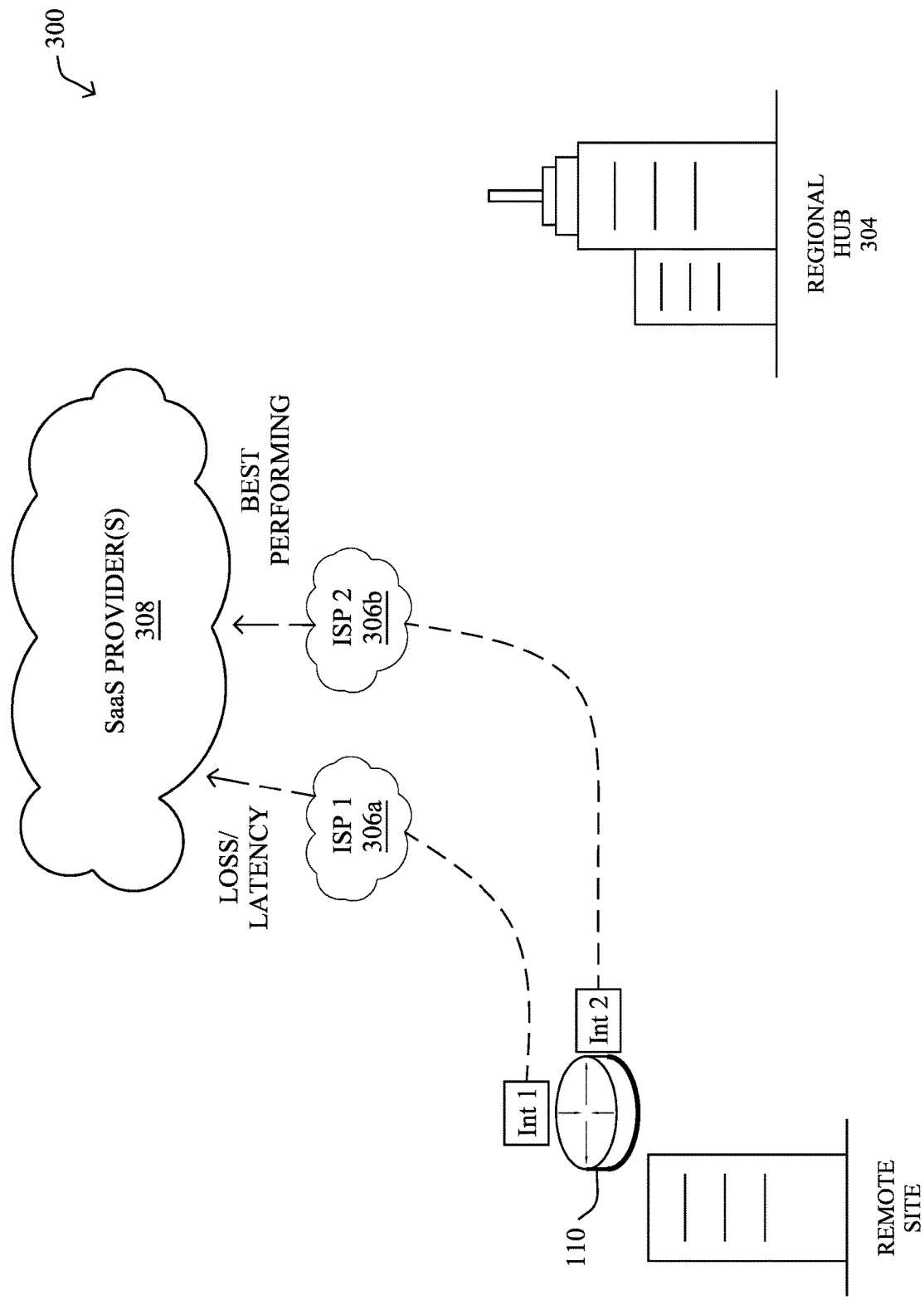
FIGS. 3A-3B illustrate example network deployments.
Figure 3B:
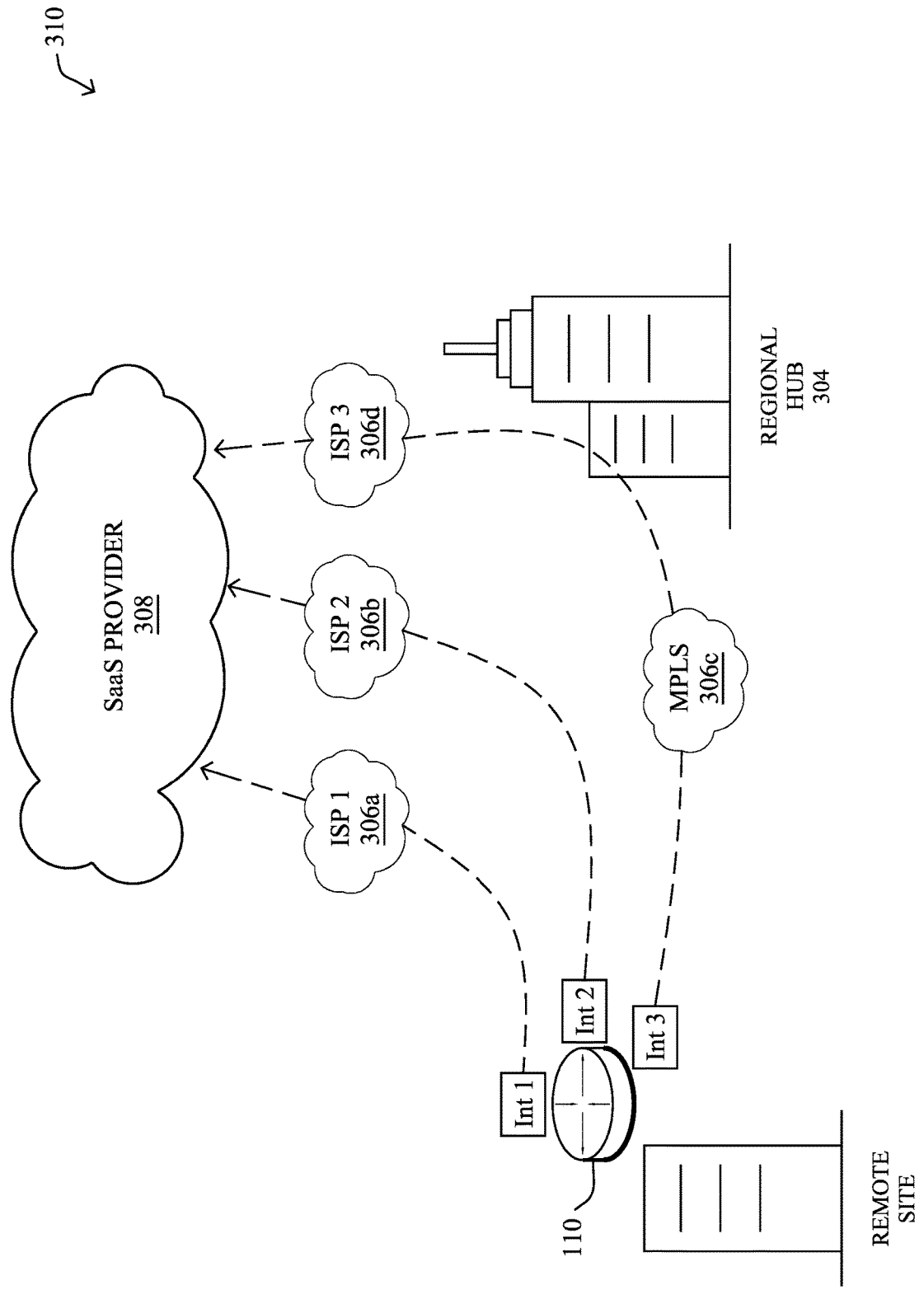

FIGS. 3A-3B illustrate example network deployments 300, 310, respectively. As shown, a router 110 (e.g., a device 200) located at the edge of a remote site 302 may provide connectivity between a local area network (LAN) of the remote site 302 and one or more cloud-based, SaaS providers 308. For example, in the case of an SD-WAN, router 110 may provide connectivity to SaaS provider(s) 308 via tunnels across any number of networks 306. This allows clients located in the LAN of remote site 302 to access cloud applications (e.g., Office365™, Dropbox™, etc.) served by SaaS provider(s) 308.

As would be appreciated, SD-WANs allow for the use of a variety of different pathways between an edge device and an SaaS provider. For example, as shown in example network deployment 300 in FIG. 3A, router 110 may utilize two Direct Internet Access (DIA) connections to connect with SaaS provider(s) 308. More specifically, a first interface of router 110 (e.g., a network interface 210, described previously), Int 1, may establish a first communication path (e.g., a tunnel) with SaaS provider(s) 308 via a first Internet Service Provider (ISP) 306a, denoted ISP 1 in FIG. 3A. Likewise, a second interface of router 110, Int 2, may establish a backhaul path with SaaS provider(s) 308 via a second ISP 306b, denoted ISP 2 in FIG. 3A.

FIG. 3B illustrates another example network deployment 310 in which Int 1 of router 110 at the edge of remote site 302 establishes a first path to SaaS provider(s) 308 via ISP 1 and Int 2 establishes a second path to SaaS provider(s) 308 via a second ISP 306b. In contrast to the example in FIG. 3A, Int 3 of router 110 may establish a third path to SaaS provider(s) 308 via a private corporate network 306c (e.g., an MPLS network) to a private data center or regional hub 304 which, in turn, provides connectivity to SaaS provider(s) 308 via another network, such as a third ISP 306d.

Regardless of the specific connectivity configuration for the network, a variety of access technologies may be used (e.g., ADSL, 4G, 5G, etc.) in all cases, as well as various networking technologies (e.g., public Internet, MPLS (with or without strict SLA), etc.) to connect the LAN of remote site 302 to SaaS provider(s) 308. Other deployments scenarios are also possible, such as using Colo, accessing SaaS provider(s) 308 via Zscaler or Umbrella services, and the like.

Figure 4:
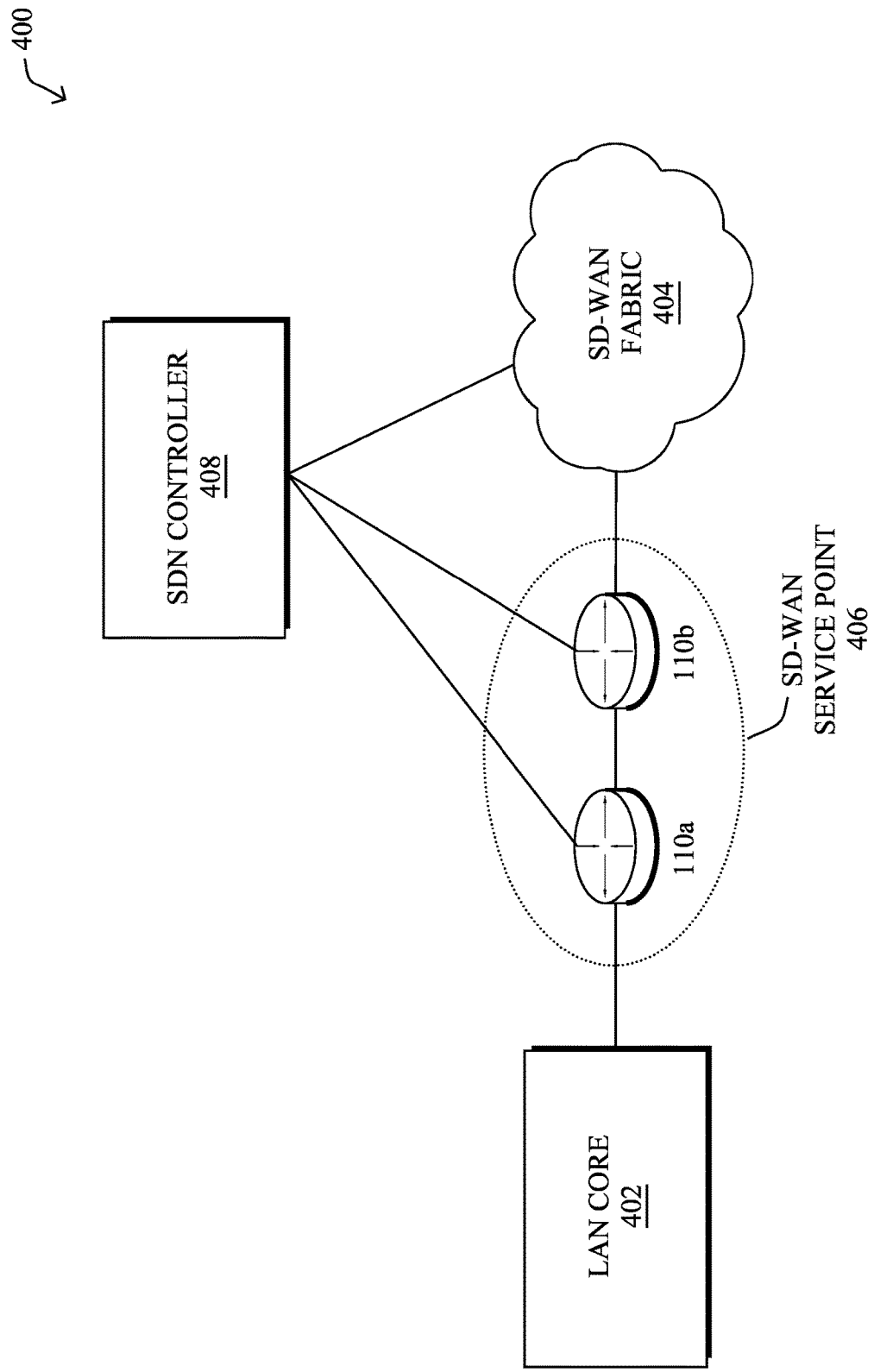
FIG. 4 illustrates an example software defined network (SDN) implementation.

FIG. 4 illustrates an example SDN implementation 400, according to various embodiments. As shown, there may be a LAN core 402 at a particular location, such as remote site 302 shown previously in FIGS. 3A-3B. Connected to LAN core 402 may be one or more routers that form an SD-WAN service point 406 which provides connectivity between LAN core 402 and SD-WAN fabric 404. For instance, SD-WAN service point 406 may comprise routers 110a-110b.

Overseeing the operations of routers 110a-110b in SD-WAN service point 406 and SD-WAN fabric 404 may be an SDN controller 408. In general, SDN controller 408 may comprise one or more devices (e.g., devices 200) configured to provide a supervisory service, typically hosted in the cloud, to SD-WAN service point 406 and SD-WAN fabric 404. For instance, SDN controller 408 may be responsible for monitoring the operations thereof, promulgating policies (e.g., security policies, etc.), installing or adjusting IPsec routes/tunnels between LAN core 402 and remote destinations such as regional hub 304 and/or SaaS provider(s) 308 in FIGS. 3A-3B, and the like.

As noted above, a primary networking goal may be to design and optimize the network to satisfy the requirements of the applications that it supports. So far, though, the two worlds of "applications" and "networking" have been fairly siloed. More specifically, the network is usually designed in order to provide the best SLA in terms of performance and reliability, often supporting a variety of Class of Service (CoS), but unfortunately without a deep understanding of the actual application requirements. On the application side, the networking requirements are often poorly understood even for very common applications such as voice and video for which a variety of metrics have been developed over the past two decades, with the hope of accurately representing the Quality of Experience (QoE) from the standpoint of the users of the application.

More and more applications are moving to the cloud and many do so by leveraging an SaaS model. Consequently, the number of applications that became network-centric has grown approximately exponentially with the raise of SaaS applications, such as Office 365, ServiceNow, SAP, voice, and video, to mention a few. All of these applications rely heavily on private networks and the Internet, bringing their own level of dynamicity with adaptive and fast changing workloads. On the network side, SD-WAN provides a high degree of flexibility allowing for efficient configuration management using SDN controllers with the ability to benefit from a plethora of transport access (e.g., MPLS, Internet with supporting multiple CoS, LTE, satellite links, etc.), multiple classes of service and policies to reach private and public networks via multi-cloud SaaS.

Application aware routing usually refers to the ability to route traffic so as to satisfy the requirements of the application, as opposed to exclusively relying on the (constrained) shortest path to reach a destination IP address. Various attempts have been made to extend the notion of routing, CSPF, link state routing protocols (ISIS, OSPF, etc.) using various metrics (e.g., Multi-topology Routing) where each metric would reflect a different path attribute (e.g., delay, loss, latency, etc.), but each time with a static metric. At best, current approaches rely on SLA templates specifying the application requirements so as for a given path (e.g., a tunnel) to be "eligible" to carry traffic for the application. In turn, application SLAs are checked using regular probing. Other solutions compute a metric reflecting a particular network characteristic (e.g., delay, throughput, etc.) and then selecting the supposed 'best path,' according to the metric.

As noted above, determining the true QoE of an application is absolutely key in making routing decisions in SDNs, such as SD-WAN networks. However, the current approach to determining the QoE of a cloud-hosted application makes use of static SLA templates applied to QoS probes that often range from being weakly correlated with the true QoE, at best, to being completely useless in discerning the true QoE of the application.

Using Throughput Mode Distribution as a Proxy for QoE and Path Selection

The techniques introduced herein adopt a completely different QoE estimation approach that consists in using traffic telemetry information (e.g., coming from NetFlow, etc.), to infer the QoE for various applications. In some aspects, the techniques herein identify the typical 'modes' of throughput for various applications on the network from which their QoE metrics can be inferred. Doing so allows for the QoE metrics to be computed without having to rely on active QoS probing and comparisons to static SLA templates.

Illustratively, the techniques described herein may be performed by hardware, software, and/or firmware, such as in accordance with QoE estimation process 248, which may include computer executable instructions executed by the processor 220 (or independent processor of interfaces 210) to perform functions relating to the techniques described herein (e.g., in conjunction with routing process 244).

Specifically, according to various embodiments, a device calculates one or more distributions of bitrates associated with an application whose traffic is conveyed via one is or more paths in a network. The device detects throughput modes of the application, based on the one or more distributions of bitrates associated with the application. The device associates each throughput mode with a quality of experience label, to form a plurality of pairs of throughput modes and quality of experience labels. The device estimates a quality of experience metric for the application, based on a bitrate of the application and the plurality of pairs of throughput modes and quality of experience labels.

Figure 6:
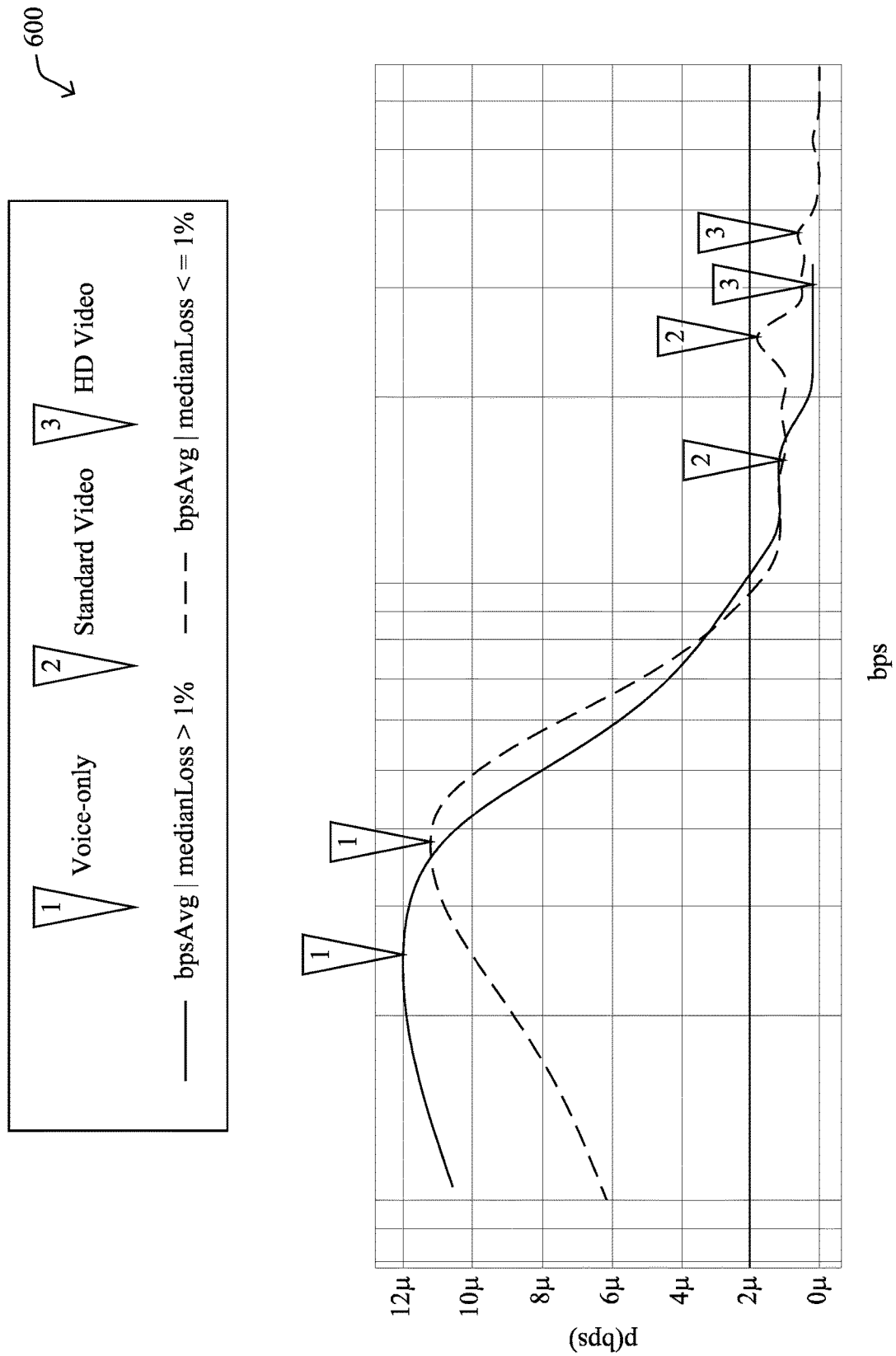
FIG. 6 illustrates an example plot of a per-flow bitrate.

Operationally, FIG. 6 illustrates an example architecture 600 for estimating the Quality of Experience (QoE) of an application, according to various embodiments. At the core of architecture 600 is QoE estimation process 248, which may be executed by a supervisory device of a network or another device in communication therewith. For instance, QoE estimation process 248 may be executed by an SDN controller (e.g., SDN controller 408 in FIG. 4), a particular networking device in the network (e.g., a router, etc.), or another device in communication therewith. As shown, QoE estimation process 248 may include any or all of the following components: an application bitrate monitor (ABM) 502, a throughput mode detector (TMD) 504, a QoE inference engine (QIE) 506, and/or a QoE validation engine (QVE) 508. As would be appreciated, the functionalities of these components may be combined or omitted, as desired. In addition, these components may be implemented on a singular device or in a distributed manner, in which case the combination of executing devices can be viewed as their own singular device for purposes of executing QoE estimation process 248.

In various embodiments, application bitrate monitor (ABM) 502 may receive and analyze telemetry data 512 from any number of traffic telemetry collectors 510 in the network under scrutiny. For instance, telemetry data 512 may comprise NetFlow records, IPFIX records, or the like, that include telemetry data regarding the various application traffic flows in the network. In various embodiments, ABM 502 may use telemetry data 512 to track the bitrate of a particular type of application traffic flow (e.g., a VoIP flow associated with Skype, Webex, Jabber, Teams, etc.) at different time granularities (e.g., from a few tens of seconds to a few tens of minutes).

From its bitrate analysis, ABM 502 may generate a series of bine-indexed bitrate records that quantify the flow bitrate per destination. For instance, an example time-indexed bitrate record may be as follows:

{
"timestamp": "2020-08-03T00:5:00,000Z",
"app_family": "voice",
"flow_bitrate_per_dest":
{
   "123.456.789.111": 2434//number of bits per second and flow of //voice traffic sent to this destination
   "987.654.321.999"; 1924,
   "111.222.333.444"; 24043
}
}

ABM 502 may produce records such as the one above for different application types/families and/or destinations. As shown above, the flow_bitrate_per_dest entry maps the number of bytes per flow marked as voice traffic for a given destination IP. Note that the destination may also be an entire subnet, without loss of generality.

In various embodiments, the time-indexed nitrate records produced by ABM 502 may be used in either or both of the following ways:

They may be stored in a datalake to be processed (in batch) to train machine learning algorithms.

They may be used as a stream of input data to an inference engine, such as QoE inference engine 506, that performs live estimations of the QoE of the application (e.g., voice) for different destinations.

In some embodiments, ABM 502 may be configured to filter only relevant applications for which it is possible to determine a proper bitrate mode. In other words, ABM 502 may operate in conjunction with throughput mode detector ('I'MD) 504, to focus solely on applications that have well-defined modes. In a further embodiment, ARM 502 may be responsible for detecting situations in which data is missing from telemetry data 512 or when telemetry data 512 is unreliable (e.g., if the source router is dropping telemetry records, etc.), to avoid polluting the dataset with corrupted data.

Another potential component of QoE estimation process 248 may be throughput mode detector (TMD) 504, in various embodiments. In general, TMD 504 may be a machine learning-driven component that uses the data produced by ABM 502 to detect the relevant modes of throughput for a given application. To achieve this, TMD 504 may rely on a large amount of historical telemetry data 512, to discover the so-called "mode" (e.g., the predominant value in a sample) of the per-flow bitrate observed for a given application. Indeed, some applications are expected to transmit at well-defined bitrates, when healthy. For instance, Skype typically requires between 30 kbps (minimum) and 100 kbps (ideal) for a voice call, and between 1.2 Mbps and 1.5 Mbps for a high-definition (HD) video call.

One observation herein is that the QoE of an application whose traffic is conveyed via a certain network path can be inferred based on the bitrate of the traffic. For instance, given the bitrate of video calls observed along a given path, it can be inferred as to whether the experience on this link is poor (low bitrate) or good (high bitrate). Many other effects can come into play, however, such as the number of participants in the call, the use of content sharing, the configuration of the client, and the like. However, observing the mode of many flows along a given path is likely to give a good indication of the QoE. Indeed, when some segment/link along the path is unable to meet the application requirements, all flows will fall back to a degraded mode of operation and a lower bitrate. Accordingly, in some embodiments, TMD 504 may identify clusters or modes in the historical distribution of per-flow bitrates and associate them with different QoE measures.

As would be appreciated, voice application and video application traffic are referred to herein for purposes of illustrating the techniques herein, the same principles can be applied to any type of application whose bitrate varies as a function of experience.

FIG. 6 illustrates an example plot 600 of a per-flow bitrate observed in a live network. As shown, the per-flow bitrate distribution in plot 600 was constructed from a 15-day dataset for Skype application traffic, with plots shown for the average bitrate when the median loss exceeds 1% and for the average bitrate when the median loss is less than or equal to 1%.

From plot 600, it can be seen that there are optimal (loss <1%) and degraded (loss >1%) modes for voice-only calls, standard video calls, and HD video calls. Indeed, the application may adjust the bitrate, automatically, when the call quality degrades. Thus, there is a correlation between the bitrate and the QoE of the application, in many cases. Note in plot 600 that HD video calls almost never happen for high losses, as Skype automatically downgrades the call quality to standard (or disables the video, to altogether), in such situations.

Figure 5:
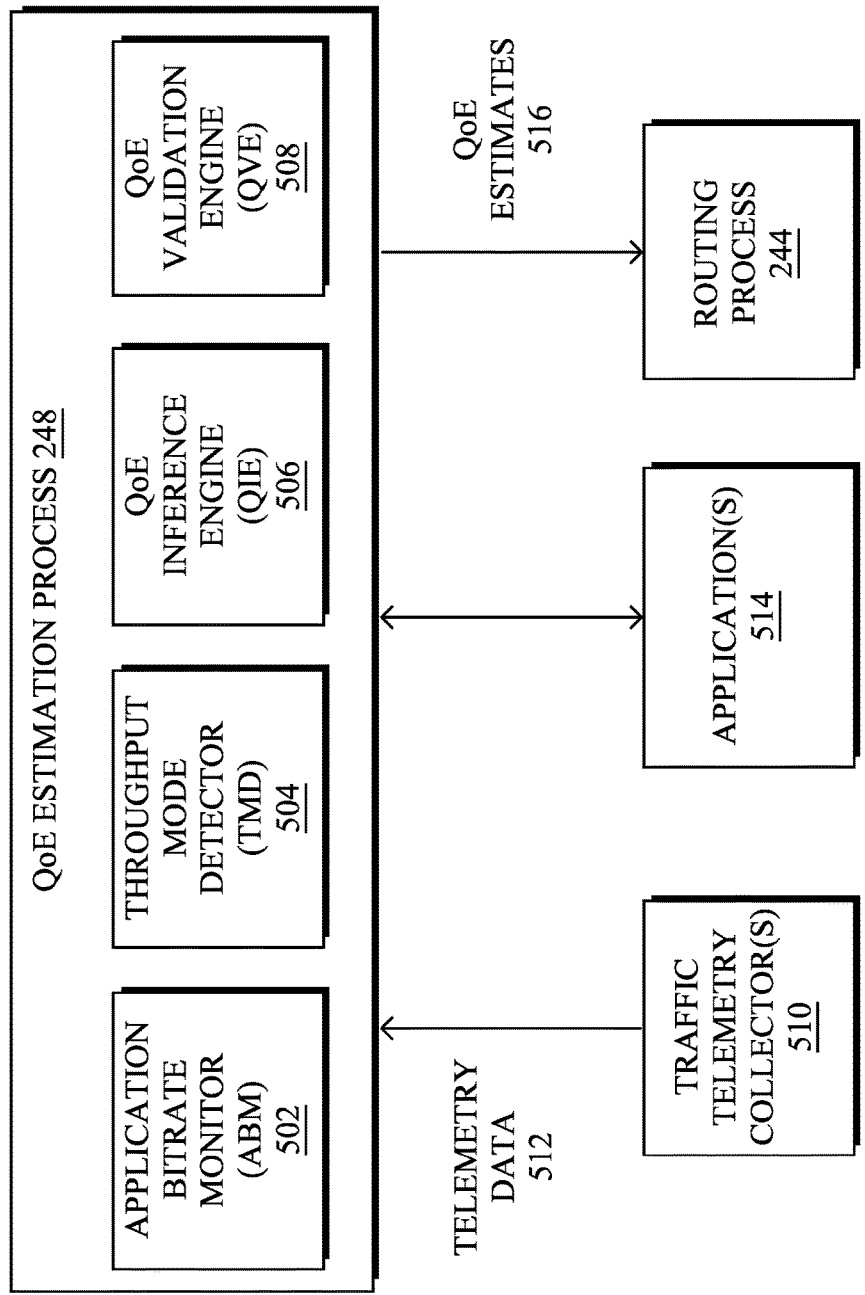
FIG. 5 illustrates an example architecture for estimating the Quality of Experience (QoE) of an application.

Referring again to FIG. 5, TMD 504 may automatically find and rank modes of the distribution by using data-driven approaches. In one embodiment, such modes can be simply treated as the local maxima in the estimated distribution. TMD 504 can estimate this distribution using an appropriate technique, such as kernel density estimation (KDE) techniques, or even by simply computing the traffic histogram. TMD 504 can then identify the maxima using a trend change detection algorithm or the like. Note, however, that this approach is quite sensitive to the choice of parameters, such the kernel for KDE, or bin size/number of bins for histograms.

In another embodiment, TMD 504 may estimate the different throughput modes, directly. Here, the idea is to make use of more robust techniques relying on some prior knowledge about the number and shape of the modes. Such techniques include, but are not limited to, k-means. Gaussian Mixture Models (GMMs), some other distribution mixture models, and other similar parametric distribution estimation techniques. What is in common among the approaches belonging to this family of algorithms is the fact they rely on two key assumptions, both easy to validate in practice:

The modes of operation are distributed according to some known distribution, e.g. gaussian, heavy tailed, positively/negatively skewed, etc.

The number of underlying modes is known.

While the first assumption above is easy to validate via simple data analysis and statistical tests, the second assumption is often grounded on the specifics of the given family of application of interest. Indeed, the second assumption is often a function of the specifics of the application itself and how it operates, such as supporting a voice-only model, one or more video modes, a multicast mode, and the like.

Next, TMD 504 may match the throughput modes across the different regimes of loss. To do so, TMD 504 may simply rank the modes and match them based on their position in the ranking, the first with the first, the second with the second, and so on. This matching can be seen in FIG. 6 for the different pairs of operation, which can be used to define whether the bitrate corresponds to a 'good' QoE or a 'degraded' QoE for the application. For instance, there is a first peak for voice-only traffic when the median loss is less than or equal to 1% and a second peak for voice-only traffic when the median loss is greater than 1%. In such a case, TMD 504 may treat the former as indicative of a good QoE and the latter as indicative of a bad QoE.

by the colors of the arrows. In this way we can define pairs of mode which will be respectively indicate whether the bitrate corresponds to a good or a degraded QoE. The so obtained pairs of modes are passed on to the next component.

Another potential component of QoE estimation process 248 is QoE inference engine (QIE) 506, which may take as input both the stream of bitrate records from ABM 502 and the list of pairs of throughput modes provided by TMD 504. In various embodiments, QIE 506 may compare the measured traffic against the pair(s) of modes, to infer the QoE of the application for a given destination or set of destinations. For illustrative purposes, let this be expressed as a score L, which denotes the likelihood that the measured traffic is flowing in a degraded bitrate regime. The relationship between flow_bitrate_per_dest from ABM 502, the modes identified by TDM 504, and the output score L may be defined as an expert-designed heuristic or, alternatively, as a regression algorithm that takes as input the statistical moments of the per-flow bitrate distribution for one or more destinations and the modes produced by TDM 504, and produces the score L. In this latter embodiment, the regression could be trained on synthetic data in a lab, based on labels set by experts, or obtained from real users, in various embodiments. Note that the regression model may also be based on a large dataset that spans multiple customers, networks, regions, and/or hardware versions.

As shown, QIE 506 may provide the resulting QoE estimates 516 (e.g., L scores) to other components, such as routing process 244, a user interface for review by an administrator, or the like. For instance, QIE 506 may indicate to routing process 244 the application and destination for which the QoE is degraded. Routing process 244 may use this information, for instance, to implement a forecasting engine that predicts the evolution of the QoE and initiates predictive routing driven directly by the QoE. In other to words, if the forecasting model of routing process 244 predicts an upcoming drop in the QoE for an application, it may initiate rerouting of its traffic, before the drop occurs.

In some embodiments, QoE estimation process 248 may also include QoE validation engine (QVE) 508, which is responsible for validating the quality/accuracy of QoE estimates 516 from QIE 506. As shown, QVE 508 may do so by querying, when available, application programming interfaces (APIs) of the application(s) 514 whose traffic is being assessed (e.g., Webex, Skype, etc.), to validate that the likelihood L produced by QIE 506 is indeed correlated with the quality of service observed from direct feedback from the users (e.g., via staffing of calls) or from internal metrics (e.g., codec degradations, etc.). QVE 508 can use this data to then adjust the heuristics or re-train the regression algorithm of QIE 506, to associate bitrate modes to QoE scores.

Figure 7:
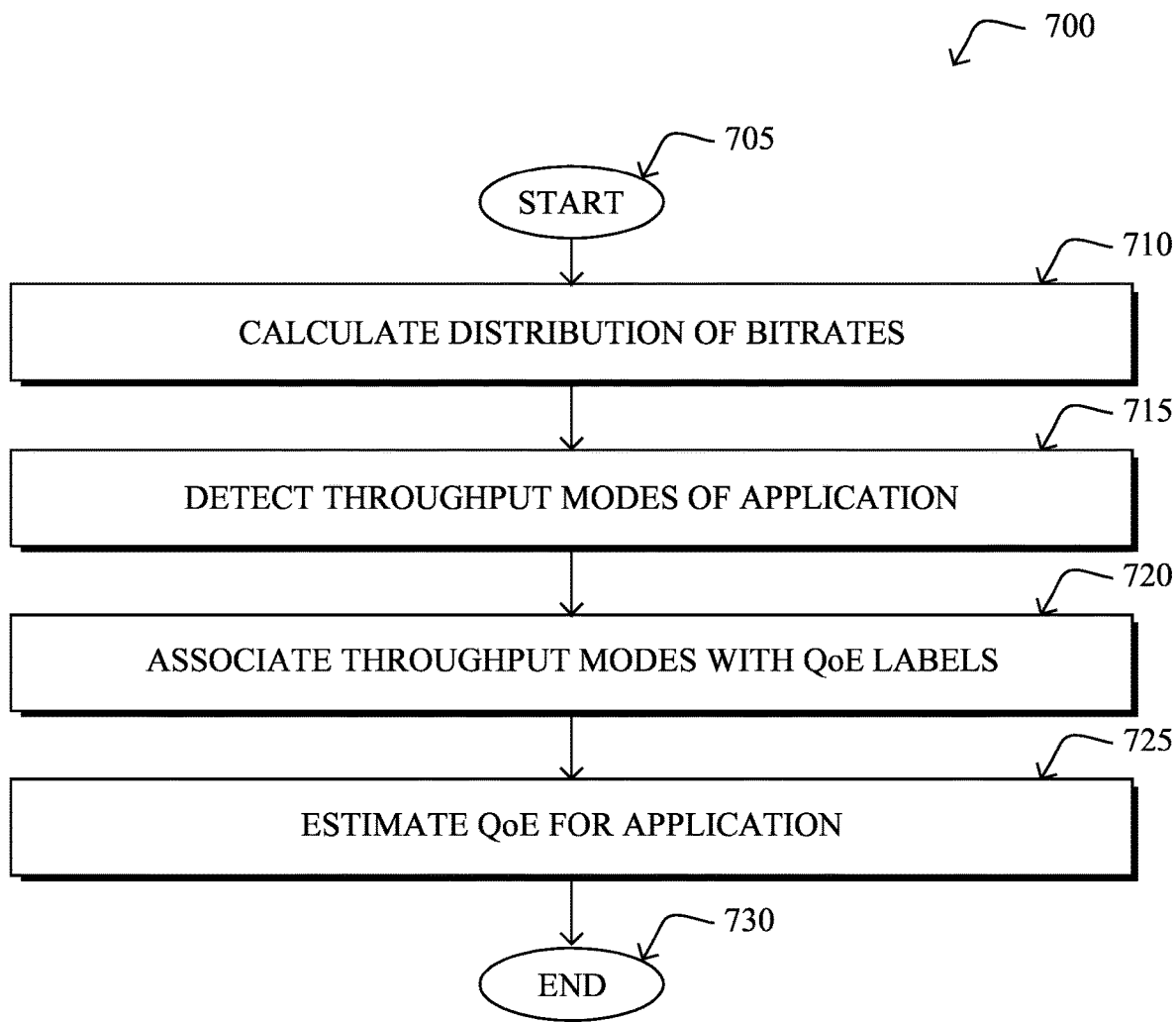
FIG. 7 illustrates an example simplified procedure for estimating the QoE of an application.

FIG. 7 illustrates an example simplified procedure for estimating the QoE of an application, in accordance with one or more embodiments described herein. For example, a non-generic, specifically configured device (e.g., device 200), such as a networking device (e.g., a router, an SDN controller for an SD-WAN, etc.), or a device in communication therewith, may perform procedure 700 by executing stored instructions (e.g., QoE estimation process 248 and/or routing process 244). The procedure 700 may start at step 705, and continues to step 710, where, as described in greater detail above, the device may calculate a distribution of bitrates associated with an application whose traffic is conveyed via one or more paths in a network. For instance, the device may generate time-indexed bitrate records for the application based on telemetry data regarding the traffic (e.g., Netflow data, etc.) and potentially on a per-flow, per-destination basis. In turn, the device may use these bitrate records to calculate the distribution of the bitrates associated with the application. In some instances, each distribution may be associated with a range of values for a network measurement, such as different ranges of loss observed for the application traffic.

At step 715, as detailed above, the device may detect throughput modes of the application, based on the one or more distributions of bitrates associated with the application. In some embodiments, the device may do so by estimating the throughput modes from the one or more distributions, based on a predefined number of throughput modes for the application. In further embodiments, the device may do so by identifying local maxima of the distribution(s) as throughput modes.

As step 720, the device may associate each throughput mode with a quality of experience label, to form a plurality of pairs of throughput modes and quality of experience labels, as described in greater detail above. For instance, the device may label a particular throughput mode as representing acceptable or unacceptable QoE for the application.

At step 725, as detailed above, the device may estimate a quality of experience metric for the application, based on a bitrate of the application and the plurality of pairs of throughput modes and quality of experience labels. In some embodiments, the device may initiate, based on the quality of experience metric estimated for the application, a rerouting of traffic of the application from the one or more paths in the network to one or more other paths (e.g., by providing the estimated QoE to a router, etc.). In further embodiments, the device may use the quality of experience metric estimated for the application to train a forecasting engine configured to forecast the quality of experience metric and proactively reroute traffic of the application, based on that forecast. In yet other embodiments, the device may retrieve a quality of experience measurement from the application and compare the quality of experience measurement from the application to the quality of experience metric estimated for the application. Based on the comparison, the device may initiate retraining of its QoE estimation mechanism, such as when the actual QoE and estimated QoE differ by a threshold amount. Procedure 700 then ends at step 730.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allows for the estimation of the QoE of an application whose traffic is conveyed via a network, by observing the bitrates of the application. Doing so avoids having to rely on actively sending QoS probes along the path(s) of the traffic and comparing the resulting QoS metrics to static SLA templates, which is often an inaccurate way of estimating the QoE of an application. In contrast, the is techniques herein leverage the observation that different throughput modes may exist for the application, allowing inferences about the QoE to be made, directly. Further, the techniques herein can be used to implement proactive routing in the network, such as when the QoE of the application is predicted to degrade over a particular path in the network.

While there have been shown and described illustrative embodiments that provide for estimating the QoE of an application, it is to be understood that various other adaptations and modifications may be made within the spirit and scope of the embodiments herein. For example, while certain embodiments are described herein with respect to using certain models for purposes of estimating QoE metrics, the models are not limited as such and may be used for other types of predictions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method comprising:
   calculating, by a device, one or more distributions of bitrates associated with an application whose traffic is conveyed via one or more paths in a network;
   detecting, by the device, throughput modes of the application, based on the one or more distributions of bitrates associated with the application;
   associating, by the device, each throughput mode with a quality of experience label, to form a plurality of pairs of throughput modes and quality of experience labels; and
   estimating, by the device, a quality of experience metric for the application, based on a bitrate of the application and the plurality of pairs of throughput modes and quality of experience labels.

2. The method as in claim 1, wherein the network comprises a software-defined wide area network (SD-WAN) and wherein the one or more paths comprise one or more network tunnels.

3. The method as in claim 1, wherein the quality of experience labels indicate whether the quality of experience of the application is acceptable or unacceptable.

4. The method as in claim 1, wherein the device calculates the one or more distributions of bitrates on a per-flow and per-destination basis.

5. The method as in claim 1, wherein associating each throughput mode with a quality of experience label, to form the plurality of pairs of throughput modes and quality of experience labels, comprises:

estimating the throughput modes from the one or more distributions, based on a predefined number of throughput modes for the application.

6. The method as in claim 1, wherein associating each throughput mode with a quality of experience label, to form the plurality of pairs of throughput modes and quality of experience labels, comprises:
identifying local maxima of the one or more distributions as the throughput modes.

7. The method as in claim 1, wherein each of the one or more distributions of bitrates is associated with a range of measured loss.

8. The method as in claim 1, further comprising:
initiating, by the device and based on the quality of experience metric estimated for the application, a rerouting of traffic of the application from the one or more paths in the network to one or more other paths.

9. The method as in claim 1, further comprising:
retrieving a quality of experience measurement from the application; and
comparing the quality of experience measurement from the application to the quality of experience metric estimated for the application.

10. The method as in claim 1, further comprising:
using the quality of experience metric estimated for the application to train a forecasting engine configured to forecast the quality of experience metric and proactively reroute traffic of the application, based on that forecast.

11. An apparatus, comprising:
one or more network interfaces;
a processor coupled to the one or more network interfaces and configured to execute one or more processes; and
a memory configured to store a process that is executable by the processor, the process when executed configured to:
calculate one or more distributions of bitrates associated with an application whose traffic is conveyed via one or more paths in a network;
detect throughput modes of the application, based on the one or more distributions of bitrates associated with the application;
associate each throughput mode with a quality of experience label, to form a plurality of pairs of throughput modes and quality of experience labels; and
estimate a quality of experience metric for the application, based on a bitrate of the application and the plurality of pairs of throughput modes and quality of experience labels.

12. The apparatus as in claim 11, wherein the network comprises a software-defined wide area network (SD-WAN) and wherein the one or more paths comprise one or more network tunnels.

13. The apparatus as in claim 11, wherein the quality of experience labels indicate whether the quality of experience of the application is acceptable or unacceptable.

14. The apparatus as in claim 11, wherein the apparatus calculates the one or more distributions of bitrates on a per-flow and per-destination basis.

15. The apparatus as in claim 11, wherein the apparatus associates each throughput mode with a quality of experience label, to form the plurality of pairs of throughput modes and quality of experience labels, by:
estimating the throughput modes from the one or more distributions, based on a predefined number of throughput modes for the application.

16. The apparatus as in claim 11, wherein the apparatus associates each throughput mode with a quality of experience label, to form the plurality of pairs of throughput modes and quality of experience labels, by:
identifying local maxima of the one or more distributions as the throughput modes.

17. The apparatus as in claim 11, wherein the process when executed is further configured to:
initiate, based on the quality of experience metric estimated for the application, a rerouting of traffic of the application from the one or more paths in the network to one or more other paths.

18. The apparatus as in claim 11, wherein the process when executed is further configured to:
retrieving a quality of experience measurement from the application; and
comparing the quality of experience measurement from the application to the quality of experience metric estimated for the application.

19. The apparatus as in claim 11, wherein the process when executed is further configured to:
use the quality of experience metric estimated for the application to train a forecasting engine configured to forecast the quality of experience metric and proactively reroute traffic of the application, based on that forecast.

20. A tangible, non-transitory, computer-readable medium storing program instructions that cause a device to execute a process comprising:
calculating, by the device, one or more distributions of bitrates associated with an application whose traffic is conveyed via one or more paths in a network;
detecting, by the device, throughput modes of the application, based on the one or more distributions of bitrates associated with the application;
associating, by the device, each throughput mode with a quality of experience label, to form a plurality of pairs of throughput modes and quality of experience labels; and
estimating, by the device, a quality of experience metric for the application, based on a bitrate of the application and the plurality of pairs of throughput modes and quality of experience labels.

* * * * *

UNITED STATES PATENT AND TRADEMARK OFFICE
CERTIFICATE OF CORRECTION

PATENT NO. : 11,425,048 B2
APPLICATION NO. : 17/122711
DATED : August 23, 2022
INVENTOR(S) : Jean-Philippe Vasseur et al.

It is certified that error appears in the above-identified patent and that said Letters Patent is hereby corrected as shown below:

In the Specification

Column 9, Line 28, please amend as shown:
with an application whose traffic is conveyed via one or Column 10, Line 5, please amend as shown:
of time-indexed bitrate records that quantify the flow bitrate Column 10, Line 15, please amend as shown:
"987.654.321.999": 1924, Column 10, Line 16, please amend as shown:
"111.222.333.444" : 24043

Column 10, Line 25, please amend as shown:
In various embodiments, the time-indexed bitrate records Column 10, Line 38, please amend as shown:
(TMD) 504, to focus solely on applications that have Column 10, Line 39, please amend as shown:
well-defined modes. In a further embodiment, ABM 502

Column 11, Line 29, please amend as shown:
to standard (or disables the video, altogether), in such Column 11, Line 47, please amend as shown:
techniques include, but are not limited to, k-means, Gauss- Signed and Sealed this
Twenty-second Day of November, 2022

Katherine Kelly Vidal
*Director of the United States Patent and Trademark Office*

CERTIFICATE OF CORRECTION (continued)
U.S. Pat. No. 11,425,048 B2

Column 12, Line 46, please amend as shown:
predictive routing driven directly by the QoE. In other Column 12, Line 59, please amend as shown:
the users (e.g., via starring of calls) or from internal metrics Column 14, Line 2, please amend as shown:
QoE of an application. In contrast, the techniques herein